United States Patent
Arian et al.

(10) Patent No.: US 9,038,766 B2
(45) Date of Patent: May 26, 2015

(54) BROADBAND FLEX JOINT ISOLATOR FOR ACOUSTIC TOOLS

(75) Inventors: Abbas Arian, Houston, TX (US); Randall B. Jones, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/984,726

(22) PCT Filed: Feb. 11, 2011

(86) PCT No.: PCT/US2011/024593
§ 371 (c)(1),
(2), (4) Date: Aug. 9, 2013

(87) PCT Pub. No.: WO2012/108884
PCT Pub. Date: Aug. 16, 2012

(65) Prior Publication Data
US 2013/0313037 A1 Nov. 28, 2013

(51) Int. Cl.
*G01V 1/52* (2006.01)
(52) U.S. Cl.
CPC ..................................... *G01V 1/523* (2013.01)
(58) Field of Classification Search
CPC ................................. G01V 1/523; G01V 1/52
USPC ......... 181/102, 104, 106, 108, 111, 112, 113, 181/122, 207, 208
See application file for complete search history.

(56) References Cited

U.S. PATENT DOCUMENTS

| | | | |
|---|---|---|---|
| 4,778,359 A * | 10/1988 | Pridy et al. | 417/545 |
| 4,872,526 A | 10/1989 | Wignall et al. | |
| 5,229,553 A | 7/1993 | Lester et al. | |
| 5,543,360 A | 8/1996 | Matsuoka et al. | |
| 5,718,532 A | 2/1998 | Mower | |
| 5,728,978 A | 3/1998 | Roberts et al. | |
| 6,484,801 B2 * | 11/2002 | Brewer et al. | 166/65.1 |
| 6,820,716 B2 * | 11/2004 | Redding et al. | 181/106 |
| 6,834,743 B2 | 12/2004 | Arian et al. | |
| 7,210,555 B2 * | 5/2007 | Shah et al | 181/108 |
| 7,334,661 B2 * | 2/2008 | Pabon et al. | 181/108 |
| 2004/0141415 A1 | 7/2004 | Reeding et al. | |

OTHER PUBLICATIONS

International Search Report and Written Opinion, International Application No. PCT/US2011/024593, 19 pgs, Feb. 9, 2012.
International Preliminary Report on Patentability, International Application No. PCT/US2011/024593, 9 pgs, May 27, 2013.

\* cited by examiner

*Primary Examiner* — Jeremy Luks
(74) *Attorney, Agent, or Firm* — Benjamin Fite; Baker Botts L.L.P.

(57) ABSTRACT

An acoustic attenuator assembly for an acoustic tool for performing acoustic investigation of a subterranean formation is disclosed. The acoustic attenuator assembly includes a first end portion (205) and a second end portion (210) having a bore therethough to enable passage of an electrical line. The acoustic attenuator assembly further includes a fiber portion (230) disposed between the first and second end portion so that the fiber portion attenuates at least a portion of acoustic energy when the acoustic energy is received by one or both of the first (205) and second (210) end portions. The fiber portion (230) includes a continuous flexible portion that allows relative deflection of the first (205) and second (210) end portions.

15 Claims, 3 Drawing Sheets

SECTION A-A

SECTION C-C

SECTION B-B

BROADBAND FLEX JOINT ISOLATOR FOR ACOUSTIC TOOLS

RELATED APPLICATION

This application is a U.S. National Stage Application of International Application No. PCT/US2011/024593 filed Feb. 11, 2011, and is hereby incorporated by reference in its entirety.

BACKGROUND

The present disclosure relates generally to well logging tools used in subterranean formations using acoustic waves and, more particularly, the present disclosure relates to methods and apparatus used to acoustically isolate the transmitter from the receiver.

Acoustic logging tools that are commonly used to characterize subterranean formations surrounding well bores. In general, acoustic logging tools operate by broadcasting an acoustic signal into a formation from one or more transmitters located at one position on the tool and receiving the signal with one or more receivers located at a second location on the tool. Properties of the received acoustic signal, such as travel time, frequency, amplitude, and attenuation, are then used to characterize the surrounding formation.

The transmitters generate a compressional waveform that travels through the wellbore fluids and into the surrounding formation. The acoustic wavefields propagate through the formation in a variety of modes, the most important being compressional waves, or "P-waves," and transverse shear waves, or "S-waves." P-waves are characterized by particle motion in the direction of wave travel while S-waves are characterized by particle motion perpendicular to the direction of wave travel. The energy mode characterized by particle motion perpendicular to the direction of wave travel is also called flexure mode. The various modes of propagation are distinguishable by their relative velocities. The velocities of both P-waves and S-waves depend on the elastic constants and the density of the medium through which the waves travel. There is a need in the art to attenuate the flexure mode in acoustic logging tools.

Ideally, the only acoustic signals received by the tool's receivers would be those signals that are transmitted by the tool that have traveled through the formation. However, if not properly isolated, the receiver will also detect other signals, sometimes referred to as "tool noise" or "road noise." This undesired noise can interfere with the ability of the tool to render an accurate representation of the acoustic response of the formation. This noise is typically energy—more specifically, vibrations—traveling within or on the surface or body of the logging tool. The noise may be a high or low frequency noise, such as that created by the transmitters or by contact of the logging tool with the wellbore.

Acoustic isolators for downhole applications must be sufficiently flexible to attenuate acoustic waves traveling at or near the surface of the tool. Acoustic isolators must also be strong enough to survive running and retrieval operations, which may be by wireline or tubing conveyed means, for example. During these operations it is often required to push or pull heavy loads via the tool. There is a need in the art for improved isolators having advantageous frequency response characteristics, while having high tension and compression limits.

FIGURES

Some specific exemplary embodiments of the disclosure may be understood by referring, in part, to the following description and the accompanying drawings.

Figure 1:
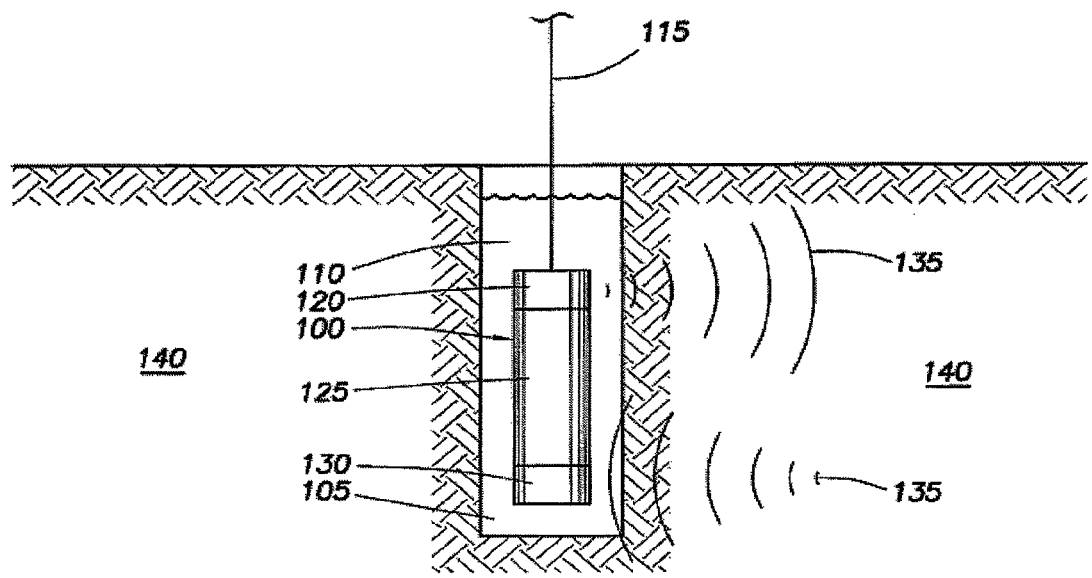
FIG. 1 is a general schematic representation of an acoustic well logging tool for performing acoustic investigation of a subterranean formation, in accordance with certain exemplary embodiments of the present disclosure.
Figure 2A:
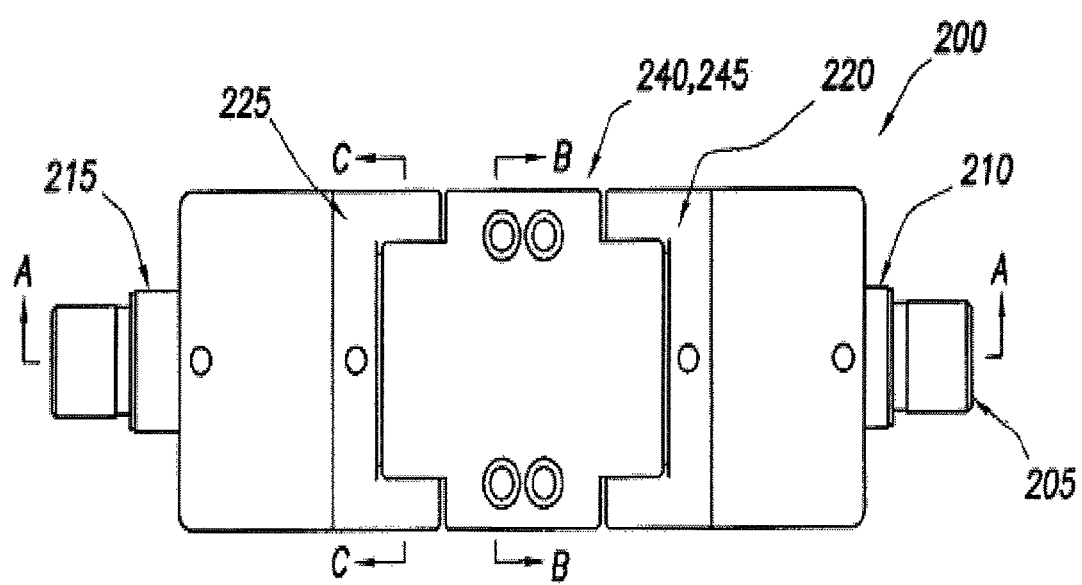
FIGS. 2A, 2B, 2C and 2D are views of a schematic representation of an acoustic attenuation flex joint assembly, in accordance with certain exemplary embodiments of the present disclosure.
Figure 2B:
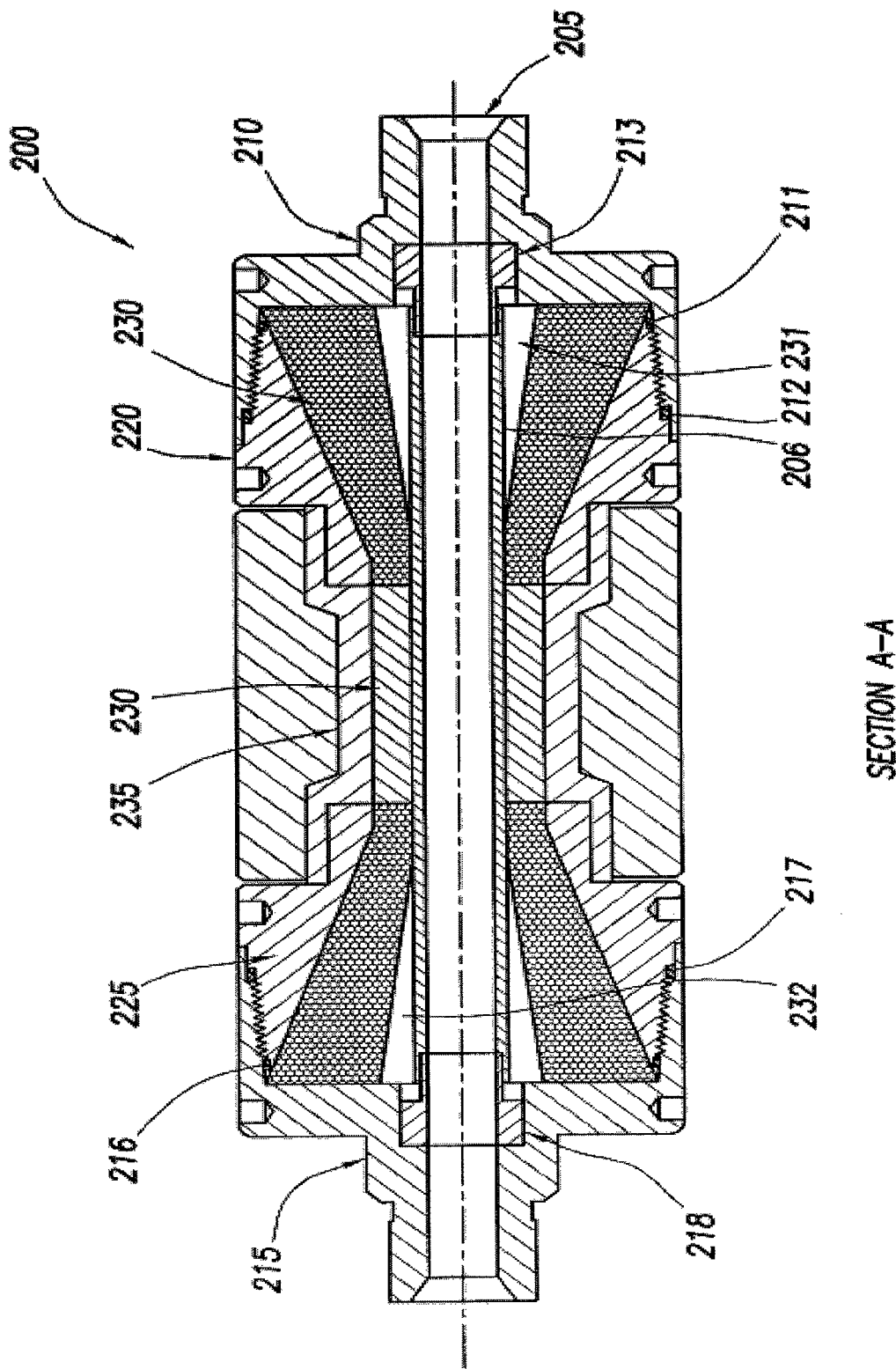
Figure 2C:
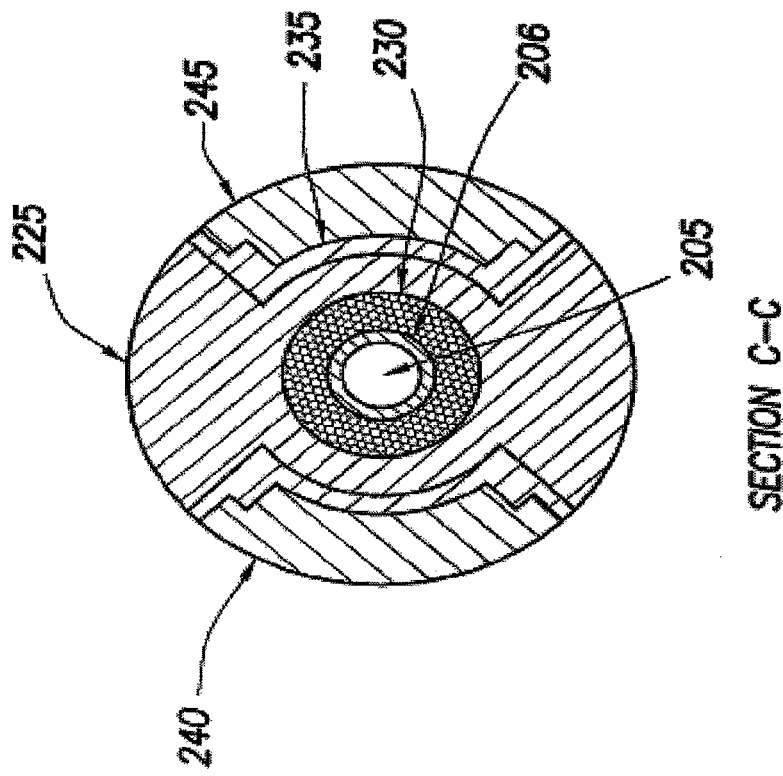
Figure 2D:
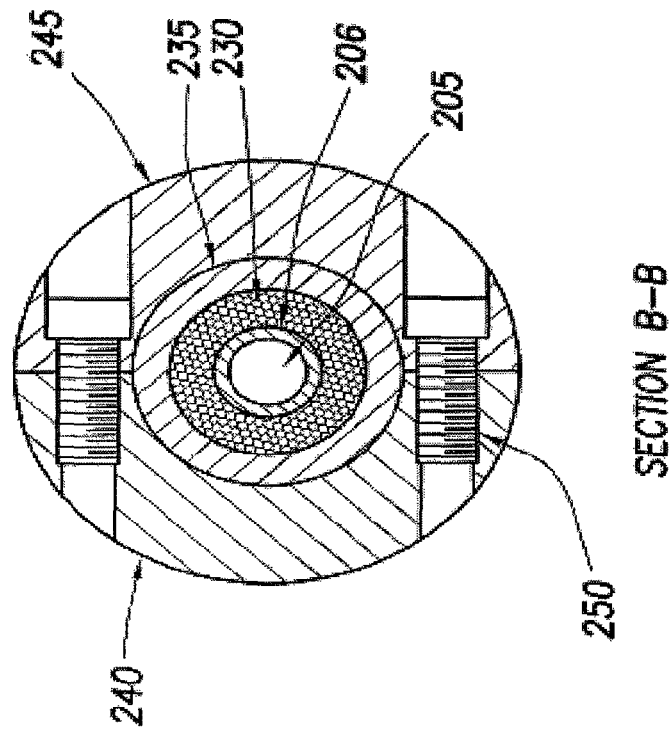

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well logging tools used in subterranean formations using acoustic waves and, more particularly, the present disclosure relates to methods and apparatus used to acoustically isolate the transmitter from the receiver.

Illustrative embodiments of the present invention are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

Exemplary embodiments according to the present disclosure may provide for attenuators having fiber/epoxy terminations and having advantageous in removing or attenuating flexural tool arrivals at lower frequencies while having high tension and compression limits required for logging. Certain embodiments may provide for an attenuator flex joint for attenuating broad band frequency signals from acoustic sources and having high strength fiber epoxy terminations for added flexibility with the ability to attenuate flexural tool arrival of energy for added attenuation at lower frequencies. Certain embodiments may provide for increased joint flexibility while maintaining the tensile strength of the system, with increased joint flexibility providing improved low frequency signal attenuation. In certain embodiments, multiple flex joints may be connected together as required to achieve the desired signal attenuation. Devices and methods in accordance with certain embodiments may be used in one or more of wireline, measurement-while-drilling (MWD) and logging-while-drilling (LWD) operations. "Measurement-while-drilling" is the term for measuring conditions downhole concerning the movement and location of the drilling assembly while the drilling continues. "Logging-while-drilling" is the term for similar techniques that concentrate more on formation parameter measurement.

FIG. 1 is a general schematic representation of an acoustic well logging tool 100 for performing acoustic investigation of a subterranean formation, in accordance with certain exemplary embodiments of the present disclosure. An acoustic well logging tool 100 may be lowered into a wellbore 105, which may contain a fluid 110. The logging tool 100 may be conveyed into the wellbore 105 by a wireline 115, a string of pipe, coiled tubing (wired or unwired), or an equivalent means. The acoustic well logging tool 100 may generally include a transmitter assembly 120, an acoustic attenuator assembly 125, and a receiver assembly 130. The term "acoustic," as used herein, is intended to generally describe the nature of the tool as one that employs the use of sound waves of any frequency and is not limited to any specific frequency range, unless specifically stated or claimed.

The transmitter assembly 120 may include one or more of a monopole transmitter, dipole transmitters, and other multipole transmitters. The transmitter assembly 120 may include control electronics to control the triggering and timing of the acoustic energy output. The control electronics may fire the acoustic sources periodically, thereby producing acoustic pressure waves that propagate through the wellbore fluid. Part of the energy from the monopole transmitter is refracted at the wellbore interface and travels through the surrounding formation as a compressional wave (P-wave) and as a shear wave (S-wave).

In general operation, the transmitter assembly 120 may generate an acoustic signal 135 that propagates through the wellbore fluid 110 and into the surrounding formation 140. The acoustic signal 135 may propagate through the formation 140 and be received by the receiver assembly 130. The received acoustic signal can be used to determine the acoustic response of the formation 140, which may indicate the properties of the formation, such as porosity, composition, and the presence of liquids or solids in the formation.

In some embodiments, the collected data and/or calculated data are stored in the tool for later analysis. In certain embodiments, the acoustic well logging tool 100 may be coupled to a telemetry transmitter (not shown) that communicates with the surface, providing telemetry signals and receiving command signals. A surface transceiver may be configured to receive transmitted telemetry signals and to transmit command signals downhole. Alternatively, the surface transceiver may be coupled to another portion of a rigging or drillstring of certain embodiments not shown. One or more repeater modules may be provided along the drill string to receive and retransmit the telemetry and command signals. The surface transceiver may be coupled to a logging facility that may gather, store, process, and analyze the telemetry information.

In certain embodiments, communication with the surface may also be provided through conductors of the wireline 115, string of pipe, coiled tubing, or equivalent means. In some example systems, power may be transmitted to the acoustic well logging tool 100 and associated instrumentation through conductors of the wireline 115, string of pipe, coiled tubing, or equivalent means from a power source at the surface. In other example systems, the acoustic well logging tool 100 may be powered from a downhole central power module, which may utilize a battery or other power source.

In order to effectively analyze the acoustic signal, the receiver of the receiver assembly 130 must be very sensitive, therefore any extraneous signal that is received has the propensity to cause interference with the desired signal and degrade the performance of the tool. The acoustic attenuator or isolator assembly 125 may be placed between the transmitter assembly 120 and the receiver assembly 130 to decrease the acoustic energy traveling directly between the transmitter and receiver without first passing through the formation 140.

FIGS. 2A, 2B, 2C and 2D are various views of a schematic representation of an acoustic attenuator flex joint assembly 200, in accordance with certain exemplary embodiments of the present disclosure. In certain embodiments, one or more acoustic attenuator flex joint assemblies 200 may be implemented in the acoustic attenuator assembly 125 illustrated in FIG. 1. The acoustic attenuator assembly 125, for example, may be substantially an elongated, cylindrical assembly having a bore through the center and having one or more attenuator modules that are linearly affixed to each other. For example, multiple attenuator modules may be connected in series between the transmitter assembly 120 and the receiver assembly 130. In certain embodiments, one or more acoustic attenuator flex joint assemblies 200 may be the only attenuator modules between the transmitter assembly 120 and the receiver assembly 130. In certain embodiments, one or more acoustic attenuator flex joint assemblies 200 may be combined with one or more additional attenuator modules between the transmitter assembly 120 and the receiver assembly 130. Various arrangements may find utility depending on the amount of signal attenuation desired and the type of signal interference sought to be attenuated. It is contemplated that any number of attenuator modules may be used to make up a single tool. It is also possible that in the event of signal interference coming from below the acoustic receiver 130, one or more attenuator modules may be installed below the receiver 130.

Referring again to FIGS. 2A-2D, the acoustic attenuator flex joint assembly 200 may be generally elongated and cylindrical when not in a flexed position. The assembly 200 may include a bore 205 that may be hydraulically isolated from the outside of the assembly 200. The bore 205 may allow for the passage of electrical lines therethrough. In certain embodiments, the assembly 200 will be oil-filled during operation. The fluid may be a non-corrosive viscous oil, such as petroleum oil or a synthetic hydrocarbon fluid that may have negligible effects on the attenuation of acoustic signals through assembly 200, while inhibiting corrosion and eliminating any affect from hydrostatic pressure in the wellbore, which could over-stress the internal parts of the assembly 200.

The assembly 200 may include end caps 210 and 215 disposed at opposing ends. The end caps 210 and 215 may have a variety of designs for mating and/or coupling to other elements of the acoustic tool, depending on the implementation. For example, a threaded coupling may be included at end caps 210 and 215 to allow for the addition of more attenuator joints (not shown).

The end caps 210 and 215 may partially surround termination housings 220 and 225, respectively. The end caps 210 and 215 may be threadedly connected, or otherwise coupled, to the termination housings 220 and 225. The couplings may be sealed with seals 211 and 216, which may be o-ring seals, for example. The couplings may further include additional seal 212 and back-up ring 217. The back-up ring 217, in some embodiments, will provide for higher pressure applications.

The termination housings 220 and 225 may surround or partially surround fiber 230. The fiber 230 may be high-performance, high-strength fiber and may serve as the main structural back bone of the flex joint assembly 200. By way of example without limitation, the fiber 230 may include one or more of high-performance liquid crystal polymer (Vectran)

(LCP), Kevlar, and other high-performance, high-strength fibers with minimal creep measurement characteristics. In certain embodiments, the fiber 230 may include LCP (Vectran) as an acoustic/vibration dampening material. At each end of the flex joint assembly 200, the fiber 230 may be molded with epoxy resin in the cone-shaped or generally cone-shaped ends.

The epoxy, by way of example without limitation, may be high-temperature, semi-flexible epoxy, with low shrinkage and with thixotropic characteristics. The ends of the fiber 230 may be terminated and coupled to the termination housings 220 and 225 with epoxy resin. At or near the center of the flex joint assembly 200, the fibers 230 may be free from any epoxy resin in order to maximize the flexibility of the section.

Spacers 231 and 232 may be positioned between the cone-shaped ends of the fiber 230. The spacers 231 and 232 may each comprise two cone-shaped halves in certain embodiments. The spacers 231 and 232 may comprise metal and may be designed to support the epoxy termination under load.

The assembly 200 may include a tubular 206 radially disposed within the fiber 230. In certain embodiments, the tubular 206 may be the innermost tubular. O-rings 213 and 218 may be disposed between the tubular 206 and the termination housings 220 and 225. The tubular 206 may be flexible at least at or near the center of the flex joint assembly 200 in order to allow for flexure of the assembly 200 as a whole. By way of example without limitation, the tubular 206 may include one or more of Teflon, nylon, and other types of engineering plastic, such as polyether ether ketone.

A resilient spacer 235 may be placed around or partially around the fiber 230 to further absorb the sound energy traveling through the attenuator section. For example without limitation, the resilient spacer 235 may be an elastomeric jacket, in the form of a split bobbin, or an equivalent means constructed of rubber, elastomer, or other means capable of further absorbing the sound energy traveling through the attenuator section while allowing for flexure. As nonlimiting examples, the resilient spacer 235 may include one or more of nitrile, hydrogenated nitrile, such as highly saturated nitrile (HSN) or Hydrogenated Nitrile Butadiene Rubber (HNDR), nitroxile, fluorocarbon (FKM, FPM), and any other material have similar properties.

Shells 240 and 245 may be connected together around or partially around the resilient spacer 235. For example without limitation, the shells 240 and 245 may be metal half shells made from heavy weight tungsten material, stainless steel, brass or any suitable material, and may be bolted together about the resilient spacer 235 with bolts 250. The shells 240 and 245 may act as inertial mass to further dissipate the acoustic energy propagating through the fiber 230. The shells 240 and 245 may be circumferentially keyed into the cone shaped ends to transfer torque through the flex joint. The end caps, termination housings, and shells may also be designed to limit the amount of flexure that the assembly can withstand in a deviated borehole. The amount and type, including the hardness, of resilient spacer 235 may be designed to limit the amount of potential flexure of the assembly in a deviated borehole.

In certain embodiments, one or more of the end caps, termination housings, and shells may be coated on its outside surface with an attenuating material, such as fiberglass. In certain embodiments, one or more of the end caps, termination housings, and shells may be constructed from a corrosion resistant material, such as tungsten, stainless steel or a nickel based alloy. The lengths of the metal half shells and fiber portion can vary to make longer or shorter flex joints according to implementation needs. Of course, it will be understood that certain of the remaining elements of the assembly may also need adjustment to accommodate the varying design lengths.

The acoustic attenuator flex joint assembly 200 also may serve to attenuate acoustic signals ranging from below 100 Hz to over 10 kHz. As the signal 135 propagates out into the formation 140, a recoil may be felt or absorbed in the body of the tool 100. Acoustic wave isolation may occur when the signal is forced to travel down the body of tool 100 or wellbore fluid 110. The inherent flexibility of the assembly 200 aids in the attenuation of acoustic signals between the transmitter and receiver. This flexibility could be a liability in other tools if the tool becomes stuck in a wellbore and has to be retrieved. Downhole tools that become stuck in the wellbore are often subjected to high axial loads (i.e., pushing and pulling) in an attempt to jar loose the stuck tools. In previous tools, such high axial loads have often caused substantial damage or failure in the acoustic attenuator components. If failure occurs, additional fishing operations are required to remove the now broken pieces of the tool from the wellbore.

However, the novel arrangement of components in the assembly 200 allows the tool as a whole to withstand high axial loading. For example, the acoustic attenuator flex joint assembly 200 may provide improved tensile strength such that it is capable of withstanding pull tests of over 80 klbs. When tension is applied, the tension may be carried through the fiber 230 and the epoxy termination. When a compressive load is applied, the compression may be carried through the termination housings 220 and 225 to the shells 240 and 245 after the gap between the members is closed. The gap may be closed when the resilient spacer 235 is compressed at high compression loads.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An acoustic attenuator assembly for an acoustic tool for performing acoustic investigation of a subterranean formation, the acoustic attenuator assembly comprising:
   a first end portion and a second end portion having a bore therethough to enable passage of an electrical line;
   a unitary fiber element disposed between the first and second end portion so that the unitary fiber element attenuates at least a portion of acoustic energy when the acoustic energy is received by one or both of the first and second end portions, wherein the unitary fiber element is flexible about its entire length to allow relative deflection of the first and second end portions.

2. The acoustic attenuator assembly of claim 1, wherein the unitary fiber element carries at least a portion of an axial load when the axial load is applied to the first and second end portions.

3. The acoustic attenuator assembly of claim 1, wherein the unitary fiber element comprises a generally cone-shaped end.

4. The acoustic attenuator assembly of claim 3, wherein the generally cone-shaped end is molded with an epoxy resin.

5. The acoustic attenuator assembly of claim 1, wherein the unitary fiber element is coupled to the first and second end portions.

6. The acoustic attenuator assembly of claim 5, wherein the unitary fiber element is coupled to the first and second end portions via an epoxy resin.

7. The acoustic attenuator assembly of claim 1, further comprising a spacer disposed at least partially about the unitary fiber element, wherein the spacer attenuates at least a portion of acoustic energy when the acoustic energy is received by one or both of the first and second end portions.

8. The acoustic attenuator assembly of claim 7, further comprising a shell disposed at least partially about the spacer, wherein the shell attenuates at least a portion of the acoustic energy when the acoustic energy is received by one or both of the first and second end portions.

9. A method for attenuating acoustic energy transmitted along an acoustic tool, wherein the acoustic tool comprises a transmitter section, a receiver section, and an attenuation section disposed between the transmitter and receiver sections, the method comprising:
   transmitting acoustic energy from the transmitter section into the attenuation section;
   transmitting acoustic energy through the attenuation section to produce an attenuated acoustic energy, wherein the attenuation section comprises a unitary fiber element disposed within the acoustic attenuator assembly so that the unitary fiber element carries at least a portion of an axial load when the acoustic attenuator assembly is under the axial load, wherein the unitary fiber element is flexible about its entire length.

10. The method of claim 9, wherein the unitary fiber element is further disposed within the acoustic attenuator assembly so that the unitary fiber element attenuates at least a portion of acoustic energy when the acoustic energy is received by the acoustic attenuation assembly.

11. The method of claim 10, wherein the acoustic attenuator assembly further comprises a spacer disposed at least partially about the unitary fiber element, wherein the spacer attenuates at least a portion of acoustic energy when the acoustic energy is received by the acoustic attenuation assembly.

12. The acoustic attenuator assembly of claim 1, further comprising:
   a transmitter assembly to transmit acoustic signals; and
   a receiver assembly to receive acoustic signals;
   wherein the acoustic attenuator assembly disposed between the transmitter and the receiver so that the unitary fiber element carries at least a portion of an axial load when the acoustic attenuator assembly is under the axial load.

13. The acoustic attenuator assembly of claim 1, wherein the acoustic attenuator assembly further comprises an elastomeric jacket disposed at least partially about the unitary fiber element, wherein the elastomeric jacket attenuates at least a portion of acoustic energy when the acoustic energy is received by the acoustic attenuation assembly.

14. The acoustic attenuator assembly of claim 13, wherein the acoustic attenuator assembly further comprises a shell disposed at least partially about the elastomeric jacket, wherein the shell attenuates at least a portion of the acoustic energy when the acoustic energy is received by the acoustic attenuation assembly.

15. The acoustic attenuator assembly of claim 14, wherein the shell comprises a tungsten material.

\* \* \* \* \*